Aug. 24, 1965    V. F. MASSA ETAL    3,201,979
ENGINE ROUGHNESS INDICATOR AND RECORDER
Filed July 16, 1962    3 Sheets-Sheet 1

VICTOR F. MASSA
HSUE CHU TSIEN    Inventors
JOHN J. HEIGL

By
    Attorney

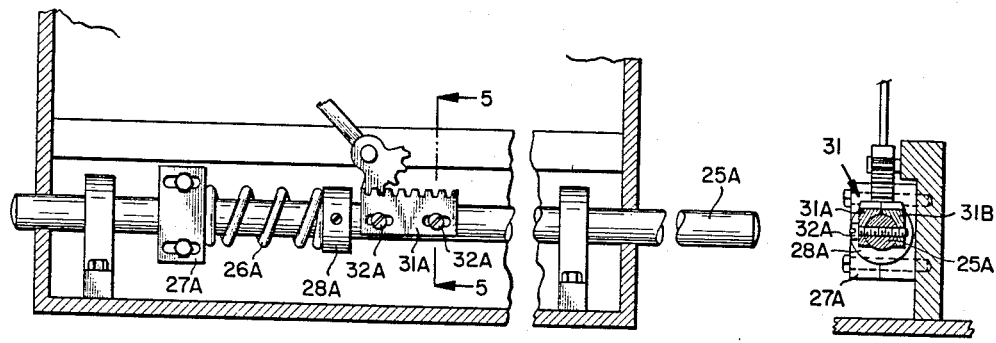
FIG.-4
FIG.-5
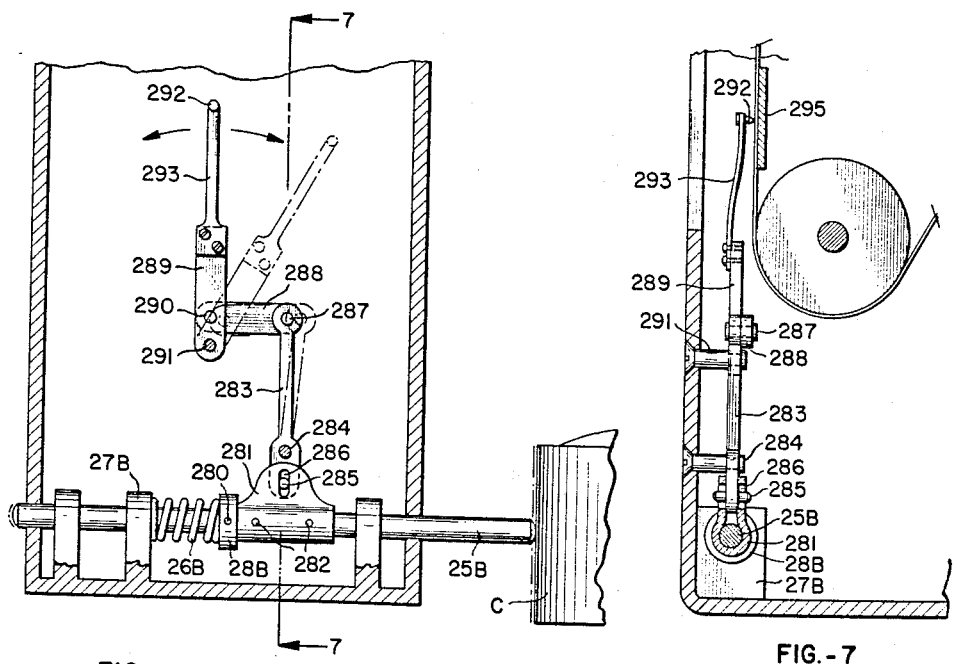
FIG.-6
FIG.-7
VICTOR F. MASSA
HSUE CHU TSIEN
JOHN J. HEIGL
Inventors
By Edwin M. Thomas
Attorney

SMOOTH IDLE

OVER ADVANCED IGNITION TIMING

SPARK PLUG MISFIRE
intermittent

SPARK PLUG MISFIRE
continuous

CARBURETOR IDLE MALADJUSTMENT
moderate

CARBURETOR IDLE MALADJUSTMENT
severe

CRANKING EFFORT

LOW CYLINDER PRESSURE

VICTOR F. MASSA
HSUE CHU TSIEN    Inventors
JOHN J. HEIGL

By

Attorney

… … 
United States Patent Office 3,201,979  
Patented Aug. 24, 1965

3,201,979  
ENGINE ROUGHNESS INDICATOR AND RECORDER  
Victor F. Massa, Berkeley Heights, Hsue Chu Tsien, Livingston, and John J. Heigl, Short Hills, N.J., assignors to Esso Research and Engineering Company, a corporation of Delaware  
Filed July 16, 1962, Ser. No. 210,141  
1 Claim. (Cl. 73—116)

The present invention relates to an engine roughness indicator and recorder, and particularly to an apparatus for sensing, mechanically amplifying, and recording characteristic vibrations of an internal combustion engine. The invention has particular application to apparatus for studying engine malperformance and for assisting in analyzing erratic engine operations with a view to correcting them. These erratic operations typically are indicated by physical movement or displacement of engines or engine parts. Most engines, particularly in automotive vehicles, are mounted in rubber and can move appreciable distances in translation or rotation about their axes (e.g., about the crankshaft axis) as unusual or uneven forces, due to malfunction, are applied.

In application Serial No. 139,979, filed by one of the present inventors on September 22, 1961, a somewhat more complex system was described which included the use of electromagnetic and electronic means for picking up and amplifying engine movements of low amplitude. The present invention is an improvement over that described in the co-pending application, and involves also some simplifications. Because of its greatly reduced cost and its adequacy for many purposes, the present invention can be made much more widely available than the more complex and more sensitive apparatus of the previous application.

It is a particular object of the present invention to design relatively inexpensive sensing and recording means to portray graphically within a few seconds, characteristics which indicate the type of malfunctioning taking place in an internal combustion engine. The invention is particularly applicable to the quick testing of automotive engines, especially those employing spark plug ignition, although it has some application to other types of equipment.

The device which is the subject of this invention is adapted for use in service stations and garages in connection with routine testing of motors for customers. It is also useful in testing facilities in connection with research and development on fuels and motors. By simple controls which will be obvious to those skilled in the art, the device can be adapted not only to record the operation of an engine under test for extended periods of time, but it may also be used to control the motor being tested. For example, if an engine under test develops unusual malfunctions or roughness in its operating characteristics which make it desirable to stop the operation, this device may be adapted to cut off the motor operation. A simple control circuit, e.g., an electrical circuit, may be used which is actuated when unusual roughness characteristics develop. This makes possible the application of the device to unattended engine test operations.

It has been found that certain graphic representations showing engine movements, when suitably amplified or exaggerated, tend to portray some highly characteristic and easily identifiable patterns. It is desirable to amplify engine displacements, for example, by at least ten times their amplitude and to place them on a traveling chart for ready visual analysis. With very little experience, an observer can run a test strip recording and determine at once the type of malfunctioning which is present. The characteristic patterns usually are clear and certain. This greatly reduces the time and labor required for analysis of an engine operation when malfunctioning is suspected.

The invention is based primarily on the discovery that by means of a suitable yieldably tensioned feeler, engine displacements sufficient to indicate quite clearly the more common characteristic malfunctions, such as misfiring of spark plugs, improper carburetor adjustment, leaky valves or other conditions giving poor compression, may be quickly and reliably portrayed and diagnosed.

The invention will be more clearly understood by specific reference to the accompanying drawings, wherein:

FIG. 4 shows in elevation a modified form of the detector and amplifying elements for translating engine movements or displacements into graphical records;

FIG. 5 is a detailed sectional view taken on the line 5—5 of FIG. 4;

FIG. 6 is a front elevational view, with parts broken away or omitted, of another modification;

FIG. 7 is a side view, partly in section, along line 7—7 of FIG. 6;

Figure 10:
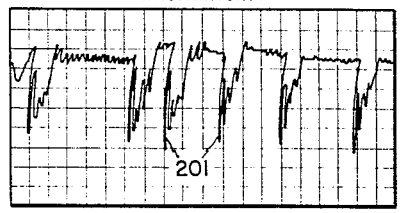
Figure 11:
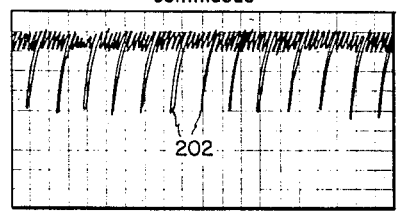
Figure 12:
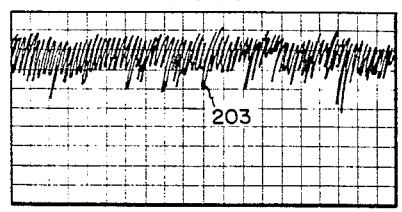
Figure 13:
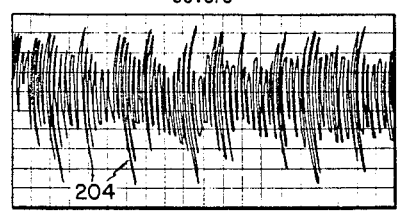
Figure 14:
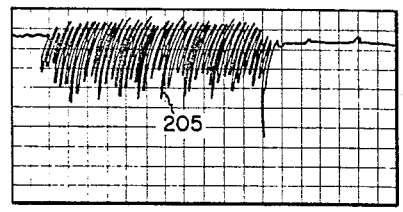
Figure 15:
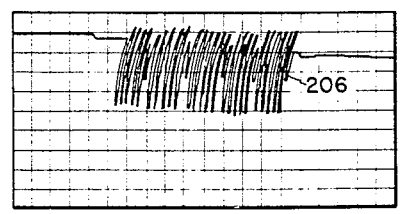

FIGS. 10 and 11 respectively show intermittent and continuous spark plug misfire;

FIGS. 12 and 13 show respectively an indication of moderate and severe carburetor adjustment;

FIG. 14 is a graphical record of an engine being turned over by its starter to test for compression; and FIG. 15 is a view similar to FIG. 14 showing an engine having low pressure in a cylinder.

Figure 1:
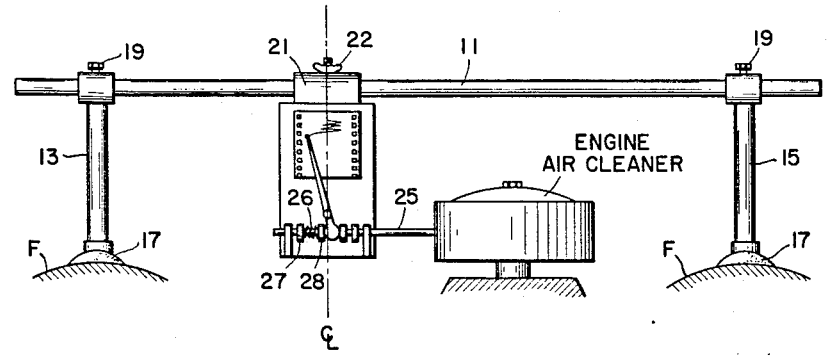
FIG. 1 is a general diagrammatic view in elevation, showing the invention applied to the engine of a conventional automobile.

Referring first to FIG. 1, the apparatus is shown as comprising a supporting bar such as a light metal tubular member 11, to which are attached support posts 13 and 15. Each of the latter is provided with a flexible mat or vacuum cup 17, preferably of rubber or the like, for mounting on the fenders F or other appropriate part of a vehicle to be tested. The posts 13 and 15 can be adjusted longitudinally of bar 11 and set in appropriate positions by set screws 19. Vertical adjustment of bar 11 with respect to posts 13, 15 may also be provided if desired.

Figures 2, 3:
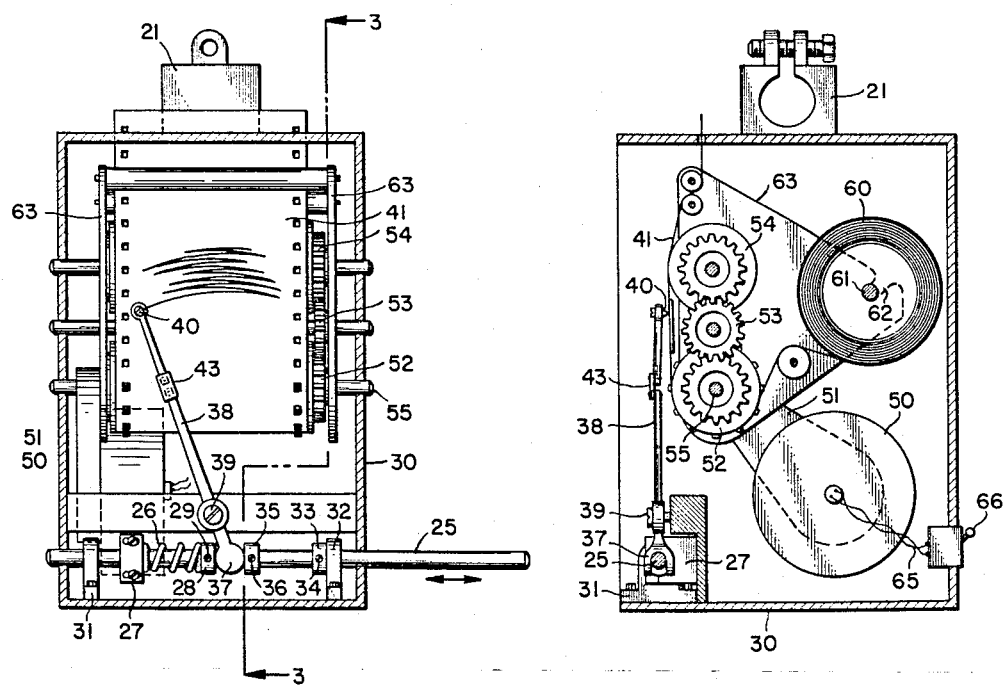
FIG. 2 is an enlarged front elevational view of the amplifying and recording elements of the apparatus shown in FIG. 1.
FIG. 3 is a sectional view taken substantially on line 3—3 of FIG. 2, certain parts being omitted.

The recording device itself is also slidably adjustable along bar 11, being provided with a suitable clamping device 21 which may be a C clamp or the like as in FIG. 3, or may have any suitable adjustment 22 as represented by the wing nut of FIG. 1. It also may be adjustable vertically if desired.

The detector element comprises a longitudinally slidable bar 25 which is yieldably urged to the right, as seen in FIGS. 1 and 2, by a spring 26. The latter is positioned between a bracket 27 which may be relatively fixed or may be adjustably mounted with respect to the recorder to vary tension in the spring, and a collar 28 secured to the bar 25 by a set screw or the like 29. As shown in FIG. 2, the recording device comprises a case or frame 30 of appropriate form, in which the recording elements are mounted as hereinafter described. The bar 25 is slidably mounted in the lower part of case 30, and slides freely and smoothly through support brackets 31 and 32 secured to or formed integrally with frame 30. A collar member 33 serves to limit the extreme displacement of bar 25 to the right under influence of spring 26, the collar 33 being attached to the bar, preferably in adjustable manner, by means of a set screw 34.

Another collar 35 also adjustably secured by set screw 36 to bar 25, is positioned to engage snugly the rounded lower end portion 37 of a pivotally mounted recording lever 38. The latter is pivoted on a suitable support 39 attached to frame 30. Obviously as rod 25 moves left or right, the recording lever 38 will swing about its pivot 39. The upper end of lever 38 carries a suitable sytlus 40 which records movements of the lever 38, across recording strip 41. The upper end of recording bar 38 is preferably biased lightly towards the strip by a flexible flat spring element 43, to apply the appropriate recording pressure to the stylus. The latter may employ ink or pencil if desired, but is preferably of a type which records by friction, the surface of the recording strip 41 being of suitable character for this purpose, as is well known in the art.

A small electric motor, preferably of the synchronous type, is indicated at 50 for driving the chart feeding mechanism. Through appropriate mechanical linkage 51, not shown in detail, the motor drives a feeding sprocket 52, which through intermediate gearing 53, drives a forwarding roller 54. These rollers are mounted on suitable axles supported in the frame 30, that of feed roller 52 being indicated at 55, FIG. 2.

A supply of recording tape or paper is indicated at 60 in the form of a roll mounted on a shaft 61, supported in suitable notches 62 of brackets 63 which form the side frames of the recording apparatus. It will be evident that the motor 50, driven by power supplied through leads 65 when switch 66 is turned on, will feed the strip upwardly as seen in FIGS. 2 and 3.

Assuming that the device is placed in position for recording, the automobile engine is turned over and the displacement movements of a suitable part of the engine are transmitted through rod 25 and amplified through the linkages 37, 38 to move the stylus 40 a distance exceeding by many times the amplitude of engine movement. It should be noted that it is bodily movement of the engine and not minor vibrations of its component parts which is to be sensed and recorded. Since the air cleaner on the average automobile has about the largest amplitude of displacement or relative motion around the crankshaft or center of gravity of the engine, it is usually convenient and desirable to place the recording device with rod 25 contacting the air cleaner. In zero position, the pointer stands about midpoint of the chart. Engine movements due to irregular forces then will cause or permit the stylus to swing right and left of the center line (FIG. 1) to record graphically the type of displacement, its periodicity, amplitude, etc. The chart is fed gradually upward by its drive mechanism as recording proceeds. A gear shift or motor speed variation may be provided, if desired, to feed the chart at varying speeds for more detailed chart analysis.

For some purposes, particularly where extremely accurate adjustment of the collars 28 and 35 is difficult, it is often desirable to employ a rack and pinion type mechanical amplifier. Such a device is shown in FIG. 4. Here the spring 26A is held under compression between lateral adjustment bracket 27A and the adjustable collar 28A. Rod 25A is similar in general to rod 25 of FIG. 2. The rack 31 is preferably formed in two relatively movable parts, 31A and 31B, which can be adjusted relative to each other by means of screws 32A. One of the parts has slots permitting slight longitudinal adjustment of one-half of the rack with respect to the other half. By these means, any play in the movement may be taken up and the full movement of the engine or engine part, even when it is of low amplitude, can be transmitted to the recorder.

As noted above, the amplitude of displacement or engine movement is likely to be quite small in most cases, even when the engine is performing poorly. Its condition may be evaluated with greater accuracy if the traces of the recording stylus are magnified to a degree of 20 to 50 or more times the original engine movement. In other words, it is desirable for the recording stylus actuating linkage to multiply engine movement or displacement by a factor of 20 to 50 or more. It has been found that a double multiplying mechanism is desirable for high multiplication factors such as those just mentioned.

In FIG. 6 an arrangement is shown wherein the sensing rod 25B, which is otherwise similar to rods 25 and 25A in FIGS. 1, 3 and 4, is employed. Rod 25B is urged against the engine part, such as air cleaner C, by a coil spring 26B mounted between a fixed bracket or post 27B and a collar 28B. The latter may be fixed adjustably to rod 25B by a set screw 280 so as to vary the compression of the spring 26B. A bracket 281 of U-shape is rigidly secured to rod 25B by fastening means such as screws 282. As seen best in FIG. 7, the upturned flanges of members 281 receive between them the lower end of an oscillatable arm 283 pivoted on a fixed axis 284 suitably mounted in the frame. The lower end of the arm 283 bears a fixed pin 285 which fits neatly and without appreciable horizontal play in a vertically elongated slot 286 formed in each side member of the U-shaped bracket 281. The latter, of course, moves right and left with displacement of the engine part C, swinging arm 283 about its axis 284. The upper end of arm 283 is connected by a pin 287 to a link 288 connected to another arm 289 by pin 290. Arm 289 is mounted pivotally on a fixed pin 291 for swinging in a vertical plane. Its upper end carries a stylus 292, the upper portion 293 being a flexible flat spring so stressed as to maintain contact between stylus and paper. The latter is supported against the stylus by a backing plate 295, the construction otherwise being similar to that of FIG. 3. Obviously the stylus records in greatly amplified form the lateral motion of the rod 25B produced by displacement of engine part C and return movement of spring 26B.

It will be understood that the engine displacements are usually of rather small amplitude, frequently of the order of $\frac{1}{32}$-inch, or even less. They may occasionally be considerably greater, but even a badly malfunctioning engine may not be subjected to very large movements. It is therefore important for good engine analysis to record the minor displacements as well as those of greater amplitude.

By using a solenoid and an electric circuit which varies in current depending on solenoid position (or relative position of core and solenoid), the sensor 25, FIGS. 1 and 2, can be employed to transmit signals electrically. Displacements of the engine causing variations in electric circuit are employed to move the stylus back and forth and thus record the motions or displacements sensed. This is explained in greater detail in the co-pending application.

In order to obtain an accurate recording of all the significant engine movements, i.e., the primary displacements in translation or rotation, as distinguished from their harmonics, it is important that the spring 26, 26A or 26B be of such material and construction that it is non-resonant throughout the band of frequencies of displacements and amplitudes (i.e., velocities and accelerations) which are to be studied. In addition to being non-resonant, the spring must not rebound under any of the normal accelerations or primary movement impulses imparted thereto. Automotive engines have operating speeds usually within the range of 200 to 5,000 r.p.m. It is desirable to be able to chart engine displacements over this whole range, allowing for multiple cylinder impulses. This means that the spring must be both non-resonant and non-rebounding, within a frequency range of about 3 to 300 cycles per second and a maximum normal amplitude. In typical American automobiles, this amplitude normally does not exceed about $\frac{1}{8}$-inch. A relatively short spring of moderate mass or stiffness is required. A typical spring has a length in its coiled form of less than three inches, and exerts a pressure of at least several pounds against the feeler 25, 25A or 25B when the stylus is in its midpoint or zero position.

With the spring appropriately selected or tensioned, the apparatus is adjusted and placed in recording position on support 11 by sliding toward the engine air cleaner until the pointer stands in mid position on the graphic scale. Various types of engine operations or malfunctions may be recorded and analyzed as will now be explained.

Figure 8:
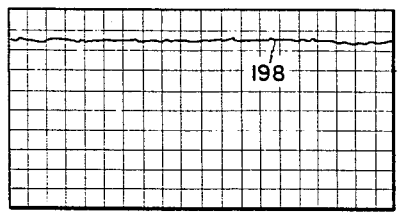
FIG. 8 is a typical graphical record of an automobile engine idling smoothly.

Referring to FIG. 8 with the engine under test idling, if it is properly tuned, engine motion will be of small amplitude and fairly regular, the irregularities being relatively minor. See trace 198.

Figure 9:
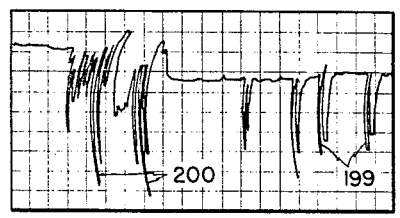
FIG. 9 is a typical record of an engine having an over-advanced ignition timing.

FIG. 9 shows a typical chart produced when the spark is advanced too far. Displacements are characteristically sharp and intense but at random intervals and of widely varying amplitude. Note the difference between traces 199 and 200, and compare the relative smooth trace 198 of FIG. 8.

The pattern is somewhat different when engine roughness is due to spark plug misfiring. With an engine running at a reasonably smooth idling speed, intermittent single vibrations of considerable but fairly uniform amplitude will be produced at varying intervals or frequency where the misfiring is intermittent. Where a single plug is misfiring periodically, the intervals frequently will be multiples of a unit interval. The long but reasonably uniform lines 201 in FIG. 10 indicate misfires and they are quite clearly distinct from the variable amplitude movements indicated by lines 199, 200 in FIG. 9.

Where a spark plug, or more than one, is misfiring continuously, the pattern is much more regular. Motions of wide but uniform amplitude and frequency tend to be the rule as indicated at 202, FIG. 11. Their spacing is very even.

Carburetor maladjustment can readily be detected by comparing the charts of FIGS. 12 and 13 with those previously described. Here the picture is ragged, displacements varying widely but frequency being fairly uniform. There is no difficulty in distinguishing the moderate pattern displacement 203, FIG. 12, or the severe maladjustment pattern 204, FIG. 13, from the patterns of FIGS. 9, 10 and 11.

When engine roughness is due neither to carburetor maladjustment nor faulty ignition, the cause is most likely to be poor compression in one cylinder or more. This will indicate an imperfect or badly fitting valve, worn or damaged piston rings or cylinder walls, or perhaps a combination of valve and ring difficulties. In any case, the motor trouble is likely to be more serious than in those instances previously mentioned. This condition can readily be detected as shown in FIGS. 14 and 15.

By cutting off the ignition and turning the motor over by its starter, a smooth even pattern 205 of wide but reasonably uniform amplitude will be indicated as in FIG. 14. Where a cylinder has low pressure, this will be indicated by the notches or traces of markedly reduced amplitude 206 spaced perfectly periodically as seen in FIG. 15.

The chart of FIG. 15, or any of the charts as previously described in FIGS. 8 to 14 inclusive, can be expanded for more precise study by speeding up the rate of movement of the chart. This is more fully explained in the previous application, Serial No. 139,979, and need not be amplified here.

It will thus be seen that the invention provides a simple, relatively inexpensive means for accurate engine analysis. Obvious modifications can be made to the apparatus, and it is intended to cover such as will be readily apparent to those skilled in the art by the following claim, as far as the prior art permits.

What is claimed is:

Apparatus for analyzing the operation of an internal combustion engine of the piston driven crankshaft type wherein said engine is subjected to periodic normal and abnormal vibratory impulses generally about the crankshaft axis and wherein means are provided for mounting said engine to permit limited oscillatory freedom thereof about said axis to reflect said periodic impulses; in combination, sensing means including a spring-loaded plunger having one end thereof in contact with a portion of said engine radially displaced from said axis, means for mounting said sensing means to a relatively fixed structure adjacent to said engine with said plunger positioned generally tangentially with respect to said axis of rotation, the other end of said plunger being connected to a transmitting means comprising a mechanical linkage for amplifying the vibratory movements of said plunger, and means connected to said linkage for recording graphically the frequency and amplitude of said impulses; said transmitting means including a rack on said sensing means, a pinion engaging said rack, an arm secured to and operable by said pinion, a stylus, and a resilient element attached to said arm and carrying said stylus whereby said resilient element continuously urges said stylus at all times into contact with said means for recording graphically the primary vibrational amplitudes and frequencies normally incident to engine operation.

References Cited by the Examiner

UNITED STATES PATENTS

| | | | |
|---|---|---|---|
| 2,764,020 | 9/56 | Gadd | 73—71.4 |
| 2,947,593 | 8/60 | Davey | 346—117 |
| 2,991,649 | 7/61 | Kinsey | 73—116 |

RICHARD C. QUEISSER, *Primary Examiner.*

JOSEPH P. STRIZAK, *Examiner.*